July 10, 1923.

L. K. DAVIS

ENDLESS TRACK VEHICLE

Filed March 20, 1923

Inventor
Lewis K. Davis
by his Attorneys
Baldwin Wight

July 10, 1923.

L. K. DAVIS

ENDLESS TRACK VEHICLE

Filed March 20, 1923

Inventor
Lewis K. Davis
by his Attorneys
Baldwin Wight

Patented July 10, 1923.

1,461,028

UNITED STATES PATENT OFFICE.

LEWIS K. DAVIS, OF WASHINGTON, DISTRICT OF COLUMBIA.

ENDLESS-TRACK VEHICLE.

Application filed March 20, 1923. Serial No. 626,376.

*To all whom it may concern:*

Be it known that I, LEWIS K. DAVIS, a citizen of the United States, residing in the city of Washington, District of Columbia, have invented certain new and useful Improvements in Endless-Track Vehicles, of which the following is a specification.

This invention relates to vehicles of the class in which endless tracks or tractor belts are employed to sustain the vehicle and traverse the ground, and especially to that class of such vehicles in which the track is laid down in front of bogies or other supporting devices which bear on the lower runs of the belts.

Various methods of steering such vehicles have been suggested, but none have been entirely satisfactory owing to the fact that usually in steering, those portions of the track which bear on the ground are moved sidewise and skid or scrape the ground and often considerable strain is thus placed on the mechanism. Such vehicles when provided with steering wheels at the front and tractor belts at the rear may be steered in the usual way and it has heretofore been suggested to steer such vehicles by bending the belts laterally and also to brake one of the driving pulleys and by differential gearing to increase the speed of the other driving pulley. In such last mentioned cases, however, serious strains have been placed on the mechanism, which it is the object of my invention to avoid.

According to my invention, the endless tracks are made laterally flexible, preferably by means of a universal joint between each pair of links composing the track. The driving pulleys and the idlers for the belts are suitably supported in the vehicle frame, while the weight of the vehicle is carried by bogies or body supporting members which bear on the lower runs of the belts and are yieldingly connected with the vehicle body. These body supporting members are so connected and so mounted as to allow the tracks to bend or flex laterally while still engaging the supporting members and they are preferably so mounted that they can move not only vertically but also laterally or horizontally to follow the lateral movements of the tracks when the latter are moved laterally and especially when so moved during the steering operation. The driving pulleys are provided with suitable brakes and these pulleys are connected with each other by differential gearing of the kind in which when the brake is applied to one of the pulleys to reduce its speed, the speed of the other pulley is correspondingly or proportionally increased. There are many kinds of such gearing in the prior art which may be employed and which are suitable for my purposes.

By my invention a tractor may be efficiently steered by merely applying the brake to one of the driving pulleys and by reason of the laterally flexible tracks the laterally movable body supporting members employed and the differential gearing used, the vehicle may be readily turned or steered without undue strain on the mechanism.

Figure 6:
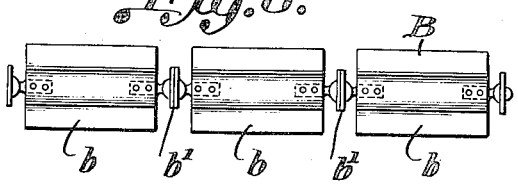
Figure 6 is a plan view of a form of tractor belt or track which may be employed.

The frame or chassis is indicated at A and may be of any suitable kind. The endless belts or tracks B may be of any desired construction so long as they can be bent laterally or about vertical axes as well as vertically or about horizontal axes. A suitable form of belt is shown in Figure 6 comprising links or shoes $b$ connected by universal or ball joints $b'$.

The tracks traverse idle pulleys C mounted in bearings in the chassis and driving pulleys D applied to axles $d$, $d'$, the inner ends of which are connected to differential gearing within the housing E.

I have not shown the details of the differential gearing employed as there are many kinds that may be used. I preferably, however employ controlled differential gearing of the kind shown, described and claimed in the application for patent of George John Rackham, filed August 1, 1922, No. 579,043.

Each axle $d$, $d'$ is provided with a suitable brake. Preferably brake drums F and G are employed associated with brake bands *f*, *g*, operated by tightening devices *h* actuated by wires or cables H extending to steering mechanism L.

The pulleys C, D are raised above the ground level and the weight of the vehicle is carried by bogies or body supporting members M which bear on the lower runs of the belts or tracks. These body supporting members may take various forms, but they should be so mounted as to be adapted to move laterally with the belts during the steering operaton. Preferably, each body supporting member comprises a pair of wheels N mounted in a frame O through which extends a horizontally arranged rod P that connects a body supporting member on one side of the vehicle with a body supporting member on the opposite side thereof. These frames O are free to slide independently on the rods P to a limited extent. Each rod P carries posts *p* which extend into sockets *a* in downwardly projecting frame members R and springs S are interposed between the members R and the clamps *r* which attach the posts to the rods.

The rollers or wheels N extend into grooves $b^2$ in the track shoes and the construction is such that when the tracks are moved laterally the wheels N with their frames O will also move laterally. It will therefore be seen that the body supporting devices or bogies are moved laterally by the belts and with the belts whenever the belts are given lateral movement for steering purposes or for any other reason.

By means of the organization shown the vehicle may be steered by merely applying the brake to one of the driving pulleys, causing it to slow down and at the same time through the controlled differential gearing employed, to speed up the driving pulley on the opposite side of the vehicle. The degree of increase may be adjusted to any desired extent by employing properly formed gearing members.

Figure 1:
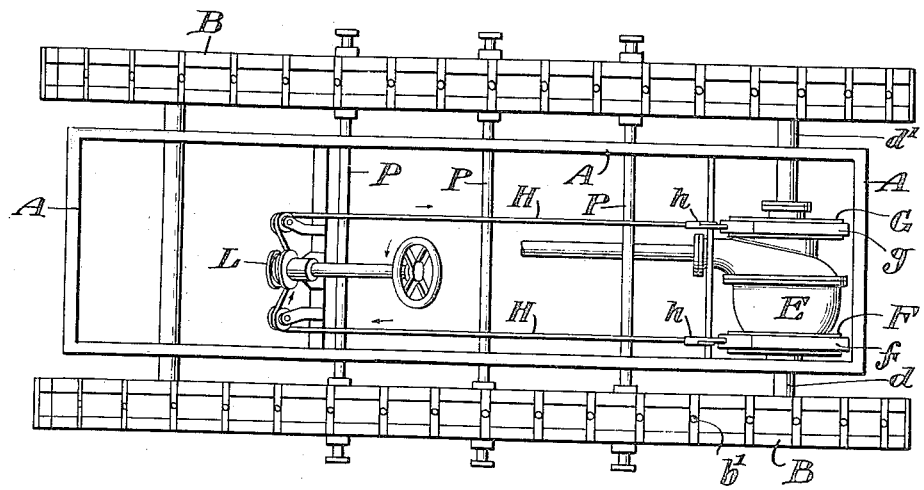
Figure 1 is a plan view of so much of an endless track vehicle with my improvements applied as is necessary to illustrate the invention herein claimed.
Figure 2:
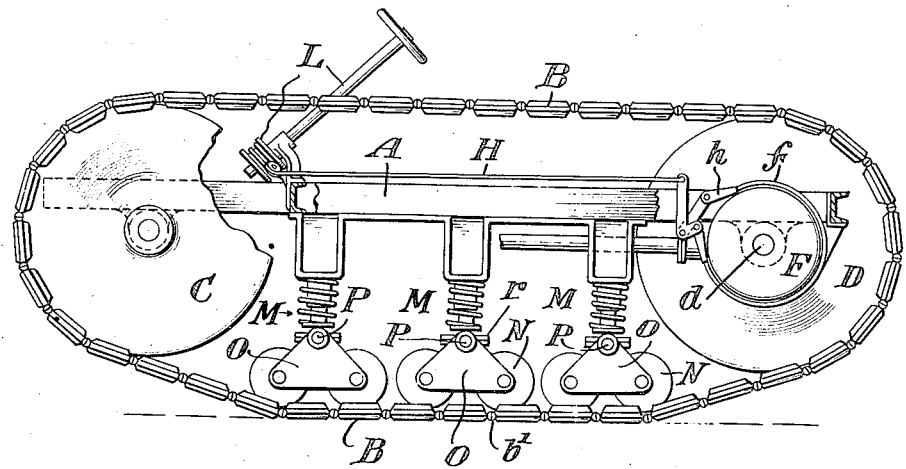
Figure 2 is a side elevation thereof.
Figure 3:
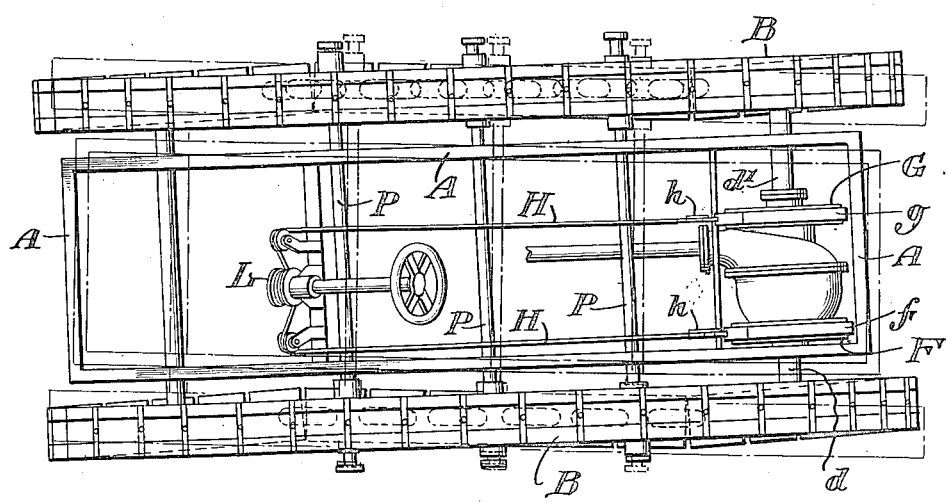
Figure 3 is a plan view similar to Figure 1 but showing how the tracks are warped or bent laterally when the vehicle is being steered.
Figure 4:
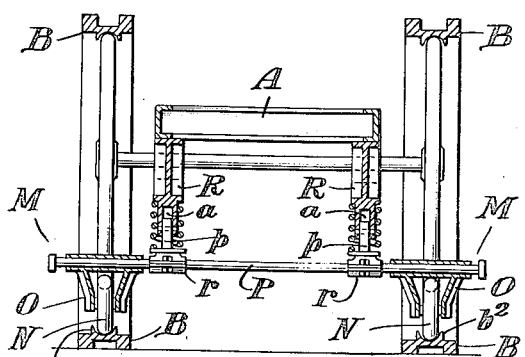
Figure 4 shows a transverse section of the vehicle.
Figure 5:
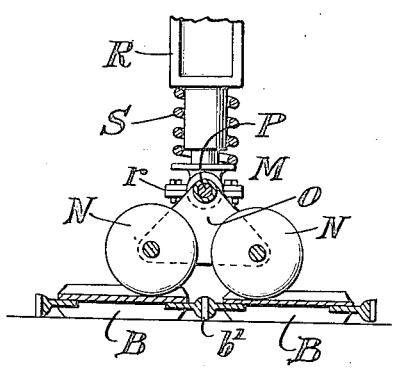
Figure 5 is a sectional view showing details of a bogie or body supporting member.

By reference to Figure 3 it will be seen that if the brake is applied to the brake drum F and loosened on the brake drum G the speed of the driving pulley on the axle D will be reduced and the speed of the pulley on the axle *d'* will be increased, thus causing the tractor belt connected with the axle *d'* to increase its speed, thus causing the vehicle to turn in the manner indicated by full lines, the normal or straight ahead position of the parts being indicated by dotted lines. Full lines in Figure 3 show the relative positions of the parts in actual service while steering.

I claim as my invention:

1. An endless track vehicle comprising a frame, endless flexible tracks carried thereby, a frame supporting member bearing on the lower run of each track and each mounted to move laterally in unison with a corresponding lateral movement of the portion of the track which it engages, driving pulleys and idlers for the tracks, differential gearing connecting the driving pulleys and independently operable brakes therefor, the application of either brake reducing the speed of the associated pulley and correspondingly increasing the speed of the other pulley to bend laterally only the lower reach of said track between the pulley and idler and give lateral movement to the body supporting members.

2. An endless track vehicle comprising a frame, driving pulleys and idlers mounted thereon, endless tracks associated with the pulleys, differential gearing connecting the driving pulleys, a brake for each driving pulley, independent means for applying and withdrawing each of the brakes, and body supporting members which bear on the lower runs of the tracks and transmit the weight of the vehicle thereto, which are mounted to move laterally or transversely of the vehicle with the laterally movable tracks, whereby steering is performed solely by application of brake to one pulley, thereby reducing its speed and increasing the speed of the other pulley to bend the tracks laterally and give lateral movement to the body supporting members.

3. An endless track vehicle comprising a frame, driving pulleys and idlers mounted thereon, endless tracks or tractor belts associated with the pulleys and comprising a series of shoes connected by joints permitting the tracks to bend vertically and laterally, differential gearing connecting the driving pulleys, a brake for each driving pulley, independent means for applying and withdrawing each of the brakes and bogies which bear on the lower runs of the belts and transmit the weight of the vehicle thereto, which are mounted to move laterally or transversely of the vehicle with the laterally moving belts, the steering being performed solely by application of the brake to one of the driving pulleys to bend laterally only the lower reach of the track and lay it down in a curve.

4. An endless track vehicle comprising a vehicle body, laterally flexible tracks associated therewith, differential gearing for drving the tracks, means for controlling the gearing to drive one track faster than the other, said means alone operating to bend the tracks and steer the vehicle, and body supporting rollers engaging the tracks and mounted for lateral movement on the vehicle body, which allow the tracks to bend laterally while still engaging the rollers.

5. An endless track vehicle comprising a vehicle body, driving pulleys and idle pulleys associated therewith, dfferential gearing for actuating the driving pulleys, means for controlling the gearing to drive the track on one side of the vehicle faster or slower than the other, said means alone operating to bend the tracks and steer the vehicle, and body supporting rollers engaging the tracks and mounted for lateral movement on the vehicle body which allow the tracks to bend laterally while still engaging the rollers.

In testimony whereof, I have hereunto subscribed my name.

LEWIS K. DAVIS.